United States Patent [19]

Head

[11] Patent Number: 4,739,868
[45] Date of Patent: Apr. 26, 1988

[54] PORTABLE ELEVATABLE AUGER

[75] Inventor: Graham S. Head, Kellerberrin, Australia

[73] Assignee: Cole Engineering Pty. Ltd., Kellerberrin, Australia

[21] Appl. No.: 836,011

[22] Filed: Mar. 4, 1986

[30] Foreign Application Priority Data

Feb. 26, 1985 [AU] Australia .............. PG9462

[51] Int. Cl.$^4$ ............................................ B65G 41/00
[52] U.S. Cl. .................... 198/316.1; 198/318; 198/861.5
[58] Field of Search ............ 198/318, 320, 315, 316.1, 198/861.5; 414/477, 479, 742; 298/17.5; 212/182

[56] References Cited

U.S. PATENT DOCUMENTS

| 1,955,238 | 4/1934 | Jones | 198/318 |
| 2,792,103 | 5/1957 | Piemont | 198/320 |
| 2,813,618 | 11/1957 | Liston | 198/318 X |
| 3,452,718 | 7/1969 | Wight | 198/316.1 X |
| 4,512,687 | 4/1985 | Enns | 198/318 X |
| 4,607,740 | 8/1986 | Jelbart | 198/861.5 X |

FOREIGN PATENT DOCUMENTS 814826  6/1959  United Kingdom ............... 198/318

Primary Examiner—Robert J. Spar
Assistant Examiner—Cheryl L. Gastineau
Attorney, Agent, or Firm—Brown, Martin, Haller & Meador

[57] ABSTRACT

A support and elevating structure for an auger tube which is carried by a chassis and comprises lifting elements between the chassis and the auger tube for elevation and lowering of the discharge end of the auger tube between lower and elevated positions, there being position adjustment elements between the chassis and auger tube so arranged that upon lowering, the auger tube moves downward and rearwardly so that the center of gravity remains vertically above the chassis and does not move forwardly thereof, thereby always ensuring that the auger tube is in a stable relationship with respect to the chassis and is unlikely to topple either when elevated and in use or when retracted over the chassis.

6 Claims, 2 Drawing Sheets

PORTABLE ELEVATABLE AUGER

This invention relates to support and elevating means for an auger tube and in particular to improvements in augers of the type which utilise a chassis frame, a lifting frame hinged with respect to the chassis frame, an auger tube hinged intermediate its ends with respect to one end of the chassis frame, and control means to control the elevating frame and thereby elevate the auger tube from a low level towing mode to an elevated mode wherein it is useful for elevating grain or other particulate material to discharge into a hopper, for example.

BACKGROUND OF THE INVENTION

Such augers are well known and in common use, and included amongst such augers are those which utilise hydraulic elevating rams between the chassis and the elevating frame. In some embodiments the upper end of the elevating frame is provided with a roller and this is engageable with a roller track on the underneath side of the auger tube near its upper end. As the elevating rams extend under hydraulic pressure, they pivot the elevating frame upwardly, and the swinging end with the roller thereon rolls along a roller track, elevating the auger tube.

The main difficulty, however, encountered with such augers, particularly when a long auger tube is used, is overbalancing of the auger. Such long augers are normally used for filling large grain silos, the centre of gravity of the auger is arranged to be over the chassis, thereby giving stable support. However, it is also a requirement that such augers be used to fill trucks or field bins, which are much lower than the silos. At this lower level the centre of gravity is now positioned towards the forward portion of the chassis, such that the auger becomes very close to overbalancing. In the case of particulate material being contained only within the discharge end of the auger, as the auger is emptying, overbalancing will occur.

The main object of this invention is to provide auger support and elevating means which will reduce this likelihood.

BRIEF SUMMARY OF THE INVENTION

Briefly, in this invention, a support and elevating means for an auger tube having a discharge end comprises a chassis having ground engaging means, pivotal means supporting the auger tube to the chassis for movement between a lower position wherein portion of the auger tube overlies a front portion of the chassis, and an elevated position wherein the auger tube slopes upwardly from a rear portion of the chassis and forwardly above said front portion, lifting means provided between the chassis and the auger tube for elevation and lowering of the discharge end of the auger tube between respective said lower and elevated positions, said pivotal support means comprising position adjustment means between the chassis and the auger tube, so constructed and arranged that, upon said lowering of said auger tube discharge end, the auger tube moves downwardly and rearwardly and its centre of gravity moves rearwardly over the chassis.

BRIEF DESCRIPTION OF THE DRAWINGS

Embodiments of the invention are described hereunder in some detail with reference to and are illustrated in the accompanying drawings in which.

DESCRIPTION OF THE PREFERRED EMBODIMENT

Figure 1:
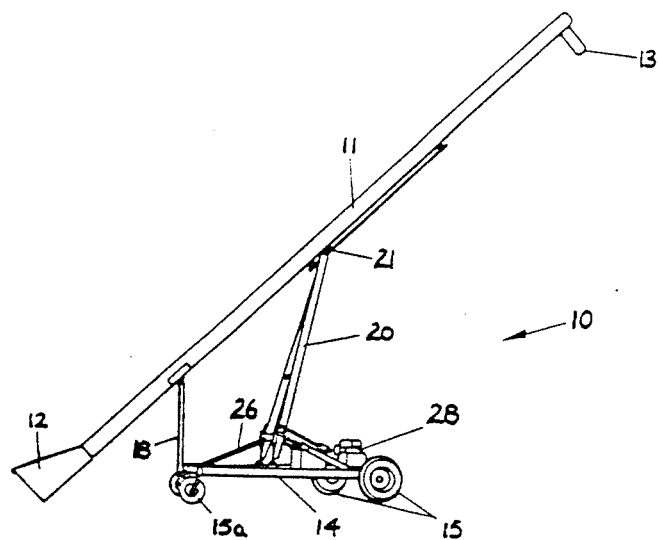
FIG. 1 shows a side perspective view of the auger assembly in an elevated position.
Figure 2:
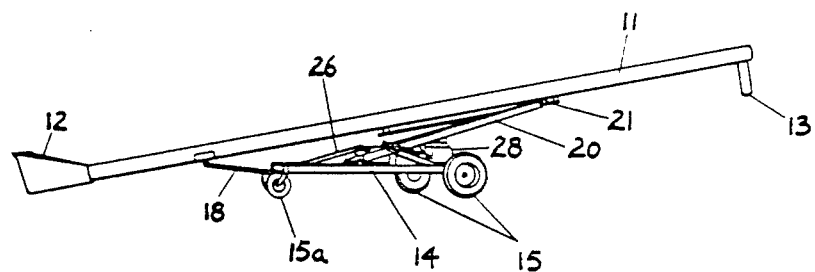
FIG. 2 shows a side perspective view of the auger assembly in a lowered position.
Figure 3:
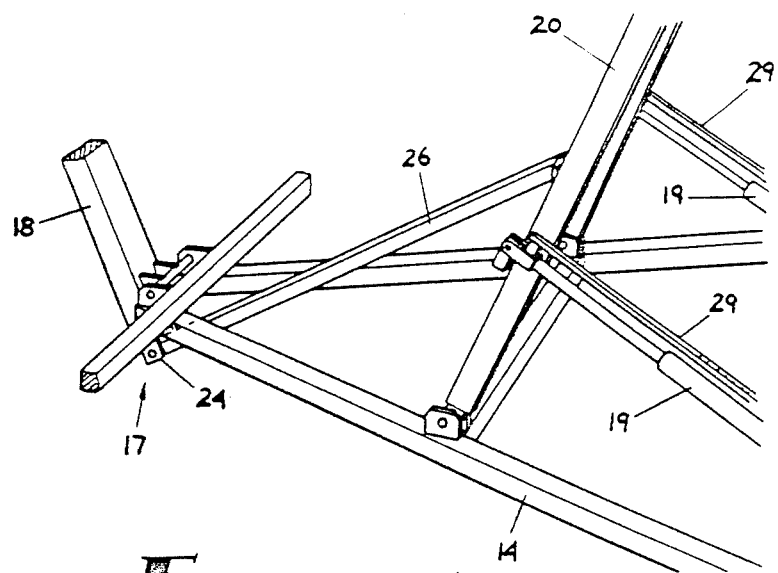
FIG. 3 shows a part perspective view of the lifting frame assembly, with the lifting frame in an elevated position.
Figure 4:
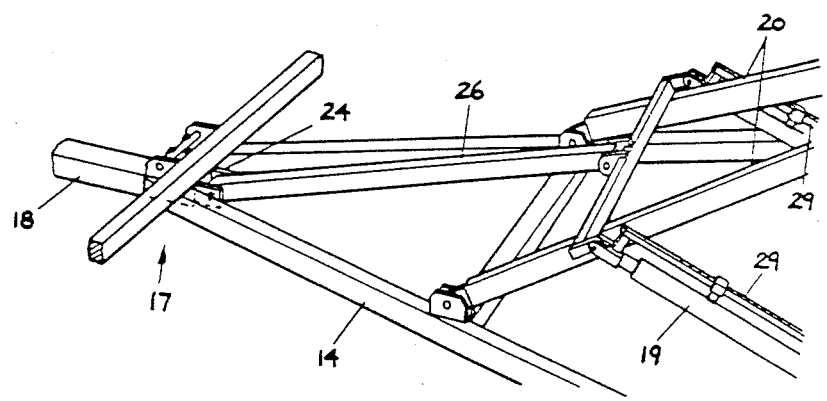
FIG. 4 shows a part perspective view of the lifting frame assembly with the lifting frame in a partly-lowered position.

In this embodiment an auger assembly 10 comprises an auger tube 11, having a delivery and discharge end 12 and 13 respectively, containing a helical flight arranged to be engine-driven in accordance with known art. There is provided a chassis frame 14 having a first axle with a pair of wheels 15 at one end of the chassis and a second frame having a pair of castor wheels 15a, the chassis frame being generally triangular in plan with its rear end having a position adjustment means 17 comprising a lever 18 pivoted intermediate of its ends to a chassis frame member.

The chassis frame also carries on it a pair of elevating rams 19, and these are coupled between the chassis frame 14 and a generally triangular lifting means comprising a lifting frame 20, the upper end of which terminates in a roller 21. The lower end of lifting frame 20 is also connected to the chassis by pivot means.

The lower end 24 of the lever 18 has a third pivot by which it is connected to one end of a lifting frame link 26 which couples it back to the lifting frame 20, which is itself also coupled to the lifting frame by pivot means.

The arrangement is such that when the elevating rams are extended, the lifting frame lifts the auger tube and at the same time rotates the position adjustment means 17 via the lever 18 and via the joint control of the chassis frame 14 and the lifting frame link 26. When however the lifting frame is lowered by contraction of the elevating rams, the lever 18 moves through more than 90° resulting in the centre of gravity of the auger tube moving towards the rear portion of the chassis to give a stable configuration.

When the auger is raised, the auger tube not only rotates about the rear end of the chassis frame but moves forwardly along its own axis, thereby adjusting the centre of gravity of the auger assembly to give a stable configuration in its upper position. In this embodiment, the longitudinal movement of the auger is in the order of 760 mm.

In addition, in this embodiment, there is provided a motorised hydraulic power source 28 for actuation of the elevating rams 19, and for powering of the auger. Also, the embodiment is provided with sliding lock means 29, which are associated with each elevating ram. These locks each comprise a bar fixed to point of attachment of the ram to the lifting frame 20, which locates, and slides within, a respective guide which is fixed to the ram cylinder. The lock is provided with a locking pin which is able to lock the bar with respect to the guide, thereby allowing the hydraulic power source 28 to be shut off, while still maintaining elevation of the auger.

The delivery end 12 of the auger is provided with a towing link means (not drawn), which, in combination with the second pair of wheels 15, (which are castor wheels) facilitates towing of the auger assembly.

In a further embodiment of this invention (not drawn) the chassis carries a pair of elevating rams and a triangular lifting frame with a roller at its end, as in the above embodiment. However, in this embodiment, the lever is pivoted to the chassis at its middle portion, thereby providing equidistant lengths which are pivotally mounted to the auger tube and lifting frame respectively. In the second embodiment, the chassis is only provided with the first pair of wheels, and the auger tube is elevated by the delivery end of the auger being supported on the ground, and the chassis rotating upwardly, about the pair of wheels. As in the previous embodiment, the centre of gravity of the auger tube is moved rearwardly with respect to the chassis. In this embodiment, the hydraulic power source is provided with a gimbal mount, so as to maintain the engine level with respect to the ground.

The invention described has been found to make the auger far more easily handled and more manoeuvrable when in its elevated mode, and much less likely to overturn as it nearly empties with particulate material in the upper end of the auger tube.

The claims defining the invention are as follows:

1. A support and elevating frame for an auger tube having a discharge end comprising:
    a chassis having ground engaging means;
    pivotal means supporting the auger tube to the chassis for movement between a lower position wherein a portion of the auger tube overlies a front portion of the chassis, and an elevated position wherein the auger tube slopes upwardly from a rear position of the chassis and forwardly above said front portion;
    lifting means provided between the chassis and the auger tube for lifting and lowering the discharge end of the auger tube between said lower and elevated positions, comprising a lifting frame, a lifting frame link, and pivot means connecting a forward end of the lifting frame link to the lifting frame,
    said auger tube support pivotal means comprising:
    a lever having a first pivot at one end pivoted to the auger tube intermediate the ends thereof;
    a second pivot intermediate the ends of the lever pivotally connecting the lever to the said chassis at one end thereof;
    and a third pivot pivotally connecting the second end of the lever to one end of said lifting frame link, the dimensions and positions of said link and said lever being so arranged that said lever depends from the first said pivot when the auger is elevated but swivels to extend forwardly from the first said pivot when the auger tube is in its lower position so that upon said lowering of said auger tube discharge end from an elevated position, the auger tube moves downwardly and rearwardly thereby repositioning its center of gravity rearwardly in relation to the chassis.

2. A support and elevating frame for an auger tube according to claim 1 wherein said ground engaging means comprise a pair of spaced transversely aligned wheels at the front end of the chassis, and a castor wheel at the rear of the chassis.

3. A support and elevating frame for an auger tube according to claim 1 wherein said lifting frame comprises a roller at its second end, and said auger tube comprises a roller engaging surface engaged by that said roller, and further comprising elevating means co-acting between the chassis and lifting frame to lift or lower the lifting frame by pivotal movement about its said first end to thereby effect said movement of the auger tube between said lower and elevated positions.

4. A support and elevating frame for an auger tube according to claim 3 wherein said elevating means comprise hydraulic lifting rams.

5. A support and elevating frame for an auger tube according to claim 3 wherein said lifting frame comprises a generally triangular frame and said roller is at the apex of that said frame.

6. A support and elevating frame for an auger tube assembly comprising:
    a chassis having a plurality of ground engaging wheels,
    a lifting frame, pivot means pivotally connecting the first end of the lifting frame to the chassis,
    said auger tube assembly having an auger tube with an elongate body having delivery and discharge ends,
    a lever having first pivot means pivotally connecting a first end thereof to the auger tube,
    second pivot means at a location which is spaced from the first end of the lever pivotally connecting the lever to the chassis,
    a roller engaging surface on the auger tube intermediate its ends, and a roller on a second end of the lifting frame engaging said surface and thereby supporting said auger tube, and
    elevating means for pivoting the lifting frame in relation to the chassis about the said pivotal connection, so as to raise the discharge end of the auger tube from a bottom position to an elevated position,
    a lifting frame link having a first end pivotally connected to the second end of the lever, and a second end pivotally connected to the lifting frame at a location which is spaced from the first end of the frame such that when the discharge end of the auger tube is raised by the frame, said first end of the lifting frame link acts against the lever such that the centre of gravity of the auger tube is repositioned so as to prevent overbalancing of the support and elevating frame.

* * * * *